United States Patent [19]

Melby et al.

[11] Patent Number: 5,441,362

[45] Date of Patent: Aug. 15, 1995

[54] CONCRETE ARMOR UNIT FOR PROTECTING COASTAL AND HYDRAULIC STRUCTURES AND SHORELINES

[75] Inventors: Jeffrey A. Melby; George F. Turk, both of Vicksburg, Miss.

[73] Assignee: The United States of America as represented by the Secretary of the Army, Washington, D.C.

[21] Appl. No.: 128,426

[22] Filed: Sep. 30, 1993

[51] Int. Cl.$^6$ ............................................. E02B 3/04
[52] U.S. Cl. ....................................... 405/16; 405/29; 52/608; D25/113
[58] Field of Search ............... 52/590, 593, 608, 609, 52/589.1; 405/15, 16, 17, 21, 23, 29, 30, 33; D25/113, 114, 115

[56] References Cited

U.S. PATENT DOCUMENTS

| | | |
|---|---|---|
| D. 277,609 | 2/1985 | Deimen ............................ D25/80 |
| D. 300,863 | 4/1989 | McNeely ....................... D25/113 |
| 2,909,037 | 10/1959 | Palmer . |
| 3,176,468 | 4/1965 | Nagai et al. . |
| 3,456,446 | 7/1969 | Kusatake . |
| 3,614,866 | 10/1971 | Kaneko et al. . |
| 3,636,713 | 1/1972 | O'Neill ............................ 405/29 |
| 3,759,043 | 9/1973 | Tokunaga . |
| 4,347,017 | 8/1982 | Chevallier ...................... 405/29 |
| 4,594,023 | 6/1986 | O'Neill ............................ 405/29 |
| 4,594,206 | 6/1986 | Grafton ...................... 405/29 X |
| 4,633,639 | 1/1987 | Deimen ............................ 52/590 |
| 5,122,015 | 6/1992 | Shen ............................. 405/284 |
| 5,190,403 | 3/1993 | Atkinson ........................ 405/29 |

FOREIGN PATENT DOCUMENTS

| | | | |
|---|---|---|---|
| 613390 | 1/1961 | Canada ............................. 405/16 |
| 2141107 | 3/1973 | Germany ........................ 405/16 |
| 178707 | 10/1983 | Japan .............................. 405/16 |
| 181909 | 10/1983 | Japan .............................. 405/16 |
| 233316 | 10/1987 | Japan .............................. 405/17 |
| 802448 | 2/1981 | U.S.S.R. .......................... 405/16 |
| 812872 | 3/1981 | U.S.S.R. .......................... 405/15 |
| 962425 | 9/1982 | U.S.S.R. .......................... 405/17 |

OTHER PUBLICATIONS

Breakwater Armour Blocks–Hydraulics Research Station, Wallingford, England.
Eric M. Merrifield, Dolos Concrete Armor Protection, Dec. 1968, pp. 38, 39, 40 & 41.

*Primary Examiner*—John A. Ricci
*Attorney, Agent, or Firm*—Katherine E. White; Luther A. Marsh

[57] ABSTRACT

A concrete armor or erosion prevention module for the protection of river, lake, and reservoir banks, shorelines and other structures is characterized by a central elongate concrete member and two outer elongate concrete members connected on opposites sides of the central member. The outer members have parallel longitudinal axes extending normal to the longitudinal axis of the central member. These elongate members all have an octagonal cross-section and are further configured such that their cross-sectional area decreases from an intermediate portion towards opposite ends thereof. A plurality of the modules may be interlocked to form a cohesive array or barrier which protects shorelines and other structure from erosive hydrodynamic forces.

9 Claims, 1 Drawing Sheet

CONCRETE ARMOR UNIT FOR PROTECTING COASTAL AND HYDRAULIC STRUCTURES AND SHORELINES

BACKGROUND OF THE INVENTION

The present invention relates to a concrete armor or erosion prevention module for protecting coastal and hydraulic structures and shorelines. These structures, particularly structures of a multiple slender-legged shape, provide a stable interlocking assembly which resists the action of waves and water currents without exceeding the structural capacity of any single component of the assembly. In general, the structures are supported by an underlying layer of stone and are held in place by gravity and by the interlocking forces between adjacent modules.

BRIEF DESCRIPTION OF THE PRIOR ART

Interlocking concrete armor or erosion prevention modules are well-known in the patented prior art as evidenced by the U.S. patents to Taisuke Kaneko et al U.S. Pat. No. 3,614,866 and Chevallier U.S. Pat. No. 4,347,017.

The Taisuke Kaneko et al patent discloses a polypod block comprised of at least three integral pillar-shaped parts joined in an alternately crossed relationship. Hence, the block has at least six appendages which interlock with other blocks so that a large number of blocks can be arranged to form tightly assembled combinations. A primary drawback of the Taisuke Kaneko et al design is that the pillar-shaped members are joined together with a minimum amount of shared surface area. This provides tremendous stress concentrations at these areas. Owing to these excessive stress concentrations, the blocks possess a higher probability for breaking, potentially leading to a massive failure of an entire arrangement or assembly of blocks. Another drawback of the Taisuke Kaneko et al block is that the appendages do not stay together in an assembled fashion. This is due to the fact that the pillar-shaped members have a square cross-section which provides a broad area of frictional engagement with neighboring blocks.

The Chevallier patent discloses a barrier block for protecting riverside structures and shorelines. The block comprises a cubic central core having top and bottom surfaces provided with anvil-shaped legs and opposed front and rear legs in the form of four-sided truncated pyramids. A major drawback of the Chevallier block is that the anvil-shaped legs are not slender and thus produce minimal interlocking stability. The blocks rely primarily on gravity forces from overlying units to enhance individual block stability and must therefore be placed on steep slopes to assure stability. However, steep-sloped structures have a tendency to fail catastrophically and have proven to have a high degree of risk when used. Further, the Chevallier blocks require exact placement in order to develop enhanced hydraulic stability.

The present invention was developed in order to overcome these and other drawbacks of the prior devices by providing an erosion prevention module which is uniquely configured to produce a high degree of interlocking which provides stability regardless of the steepness of the structure's slope. Internal stress levels are minimized by shortening the appendages by filleting all of the internal member intersections.

SUMMARY OF THE INVENTION

Accordingly, it is a primary object of the present invention to provide an erosion prevention module for the protection of river, lake and reservoir banks, shorelines and other structures from the damaging hydrodynamic forces of waves and water currents. The module includes a central elongate concrete member and two outer elongate concrete members, all of which have octagonal cross-sections. The two outer members are connected with the central member on opposite sides thereof. The outer members have parallel longitudinal axes extending normal to the longitudinal axis of the central member. The elongate members are configured such that their cross-sectional area decreases from an intermediate portion toward opposite ends thereof.

According to a further object of the invention, the elongate members are configured as two frustums joined at their bases by an intermediate portion.

It is another object of the invention to connect the elongate members at their central intermediate portions.

According to a more specific object of the invention, the elongate members are connected via chamfered surfaces, whereby stress between the members is reduced.

According to a further object of the invention, the elongate members include internal reinforcing bars.

BRIEF DESCRIPTION OF THE FIGURES

Other objects and advantages of the invention will become apparent from a study of the following specification when viewed in the light of the accompanying drawing, in which.

DETAILED DESCRIPTION

Figure 1:
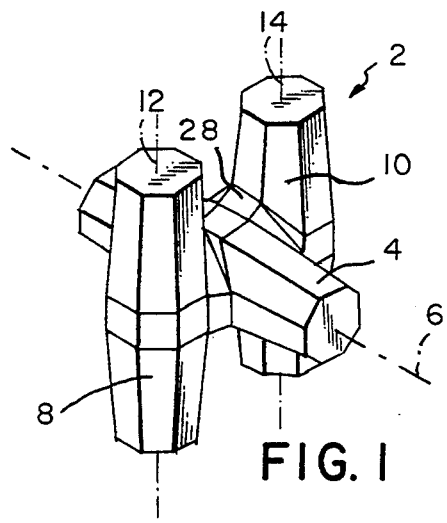
FIG. 1 is a perspective view of a first embodiment of an erosion prevention module according to the invention.

Referring first to FIG. 1, the erosion prevention module 2 of the present invention comprises a central elongate member 4 having a longitudinal axis 6 and two outer elongate members 8 and 10 having longitudinal axes 12 and 14 respectively. The outer elongate members 8 and 10 are connected with the central elongate member 4 on opposite sides thereof. The longitudinal axes 12 and 14 of the outer elongate members 8 and 10 extend parallel to each other and normal to the longitudinal axis of the central member. Preferably, the elongate members are connected at their central portions.

The three elongate members are substantially identical in shape and dimensions, and, in the preferred embodiment, have an octagonal cross-section.

Figure 3:
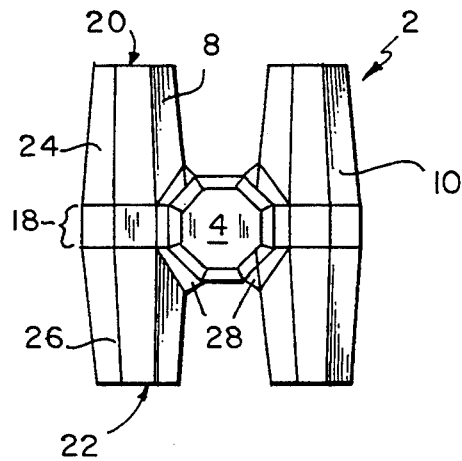
FIG. 3 is a front plan view of the erosion prevention module of FIG. 1.

As shown in FIG. 3, each of the elongate members is configured such that the cross-sectional area decreases from an intermediate portion 18 toward the opposite ends 20 and 22 thereof. More particularly, the shape of each elongate member comprises an intermediate portion 18 having the bases of two frustum-shaped sections 24 and 26 secured at opposite ends thereof.

The connections between the central elongate member 4 and the outer elongate members 8 and 10 comprise chamfered surfaces 28 which reduce stress at the area of concentration.

Figure 4:
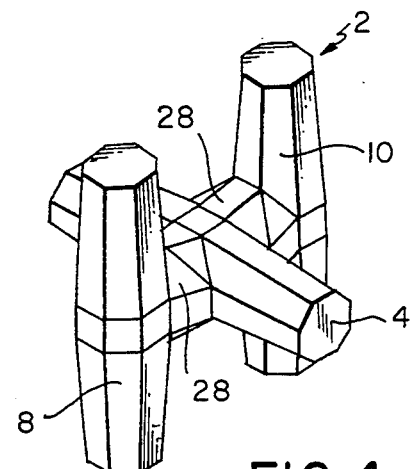
FIG. 4 is a perspective view of a second embodiment of an erosion prevention module.
Figure 5:
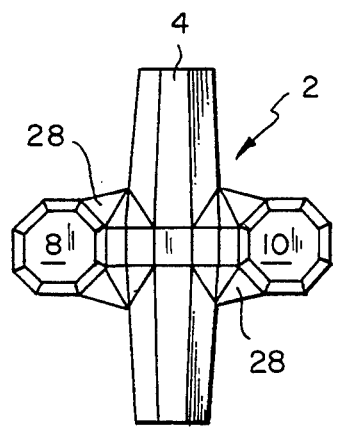
FIG. 5 is a top plan view of the erosion prevention module of FIG. 4.
Figure 6:
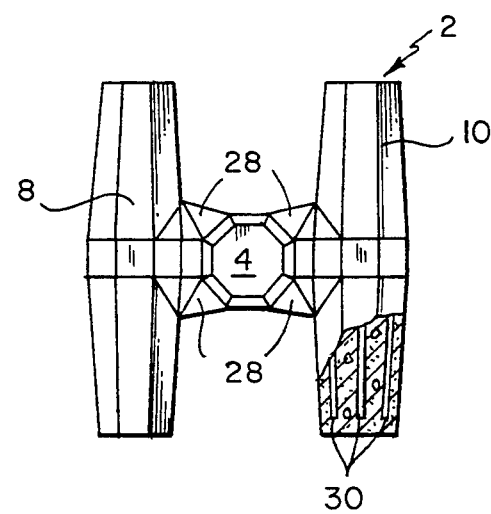
FIG. 6 is a front plan view of the erosion prevention module of FIG. 4 partially cut away to illustrate internal reinforcing bars.

FIGS. 4 through 6 illustrate a second, slender embodiment of the invention comprising elongate members having reduced cross-sectional area with extended connections, or spacing, between the outer members and the central member.

Figure 2:
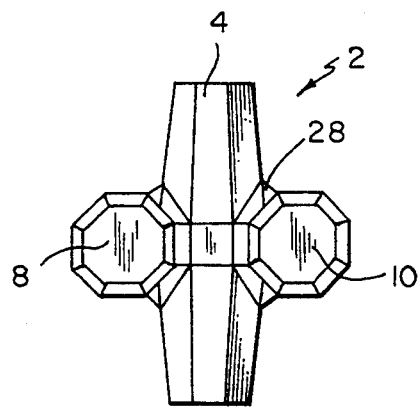
FIG. 2 is a top plan view of the erosion prevention module of FIG. 1.

Either embodiment of the present invention is adapted to be arranged with a multiplicity of other such modules to form a cohesive, interlocking armor array or barrier which resists hydrodynamic forces tending to erode shorelines and other structures. Ideally, stability is maintained in such an array or barrier even when individual modules are removed from the bottom by hydraulic action. The octagonal elongate members maintain a high degree of wedging with one another while spacing between the members and the chamfered surfaces offer excellent stability within an array. Assemblies formed from slender erosion prevention modules (FIGS. 4-6) will have greater stability than assemblies of stout modules (FIGS. 1-3) due to better interlocking between elongate members. Modules having varying aspect ratios (i.e. a degree of slenderness or stoutness) may be provided so that modules can accommodate a wider range of gradation of underlayer stone and optimization of stress versus layer stability.

Although preferably made from concrete, the entire module may be formed of any suitable material or combination of materials such as stone and/or metal. Both embodiments of the invention are strong enough not to require structural strengthening, although such strengthening may be included if desired. As shown in FIG. 6, the module may include internal reinforcing bars 30, such as metal rebar, in the elongate members. The bars extend generally parallel to the axis of the elongate member. If desired, a latticework of internal reinforcing bars may be provided. The bars can be either deformed rods or post-tensioned rods for extreme conditions.

Because of their unique configuration, the modules can be efficiently stored in a casting yard since the units can be tightly packed or stacked in multiple layers in a herring-bone configuration.

The modules of the invention are also characterized by six truncated octagonal members which are similar in shape to provide symmetry. The symmetry aids in developing interlocking stability when the units are randomly placed.

While in accordance with the provisions of the patent statute and the preferred forms and embodiments have been illustrated and described, it will be apparent to those of ordinary skill in the art that various changes and modifications may be made without deviating from the inventive concepts set forth above.

We claim:

1. An erosion prevention module for protecting coastal, river, lake, and reservoir banks, shorelines and other structures from the damaging hydrodynamic forces of waves and water currents, comprising
    (a) a central elongate member having a longitudinal axis; and
    (b) first and second outer elongate members connected with said central elongate member on opposite sides thereof, said first and second outer elongate members having parallel longitudinal axes extending normal to said longitudinal axis of said central elongate member, said elongate members each having an octagonal cross-section, the cross-sectional area of each member decreasing from an intermediate portion toward the opposite ends thereof, whereby when a plurality of structures are interlocked to define a protective array, a high degree of wedging is afforded between said octagonal members and residual stability is provided in the array.

2. An erosion prevention module according to claim 1, wherein each of said elongate members is configured as two frustums joined at their bases by said intermediate portion.

3. An erosion prevention module according to claim 1, wherein each of said elongate members is connected at its said intermediate portions, respectively.

4. An erosion prevention module according to claim 1, wherein said central elongate member and said outer elongate members are connected via chamfered surfaces, whereby stress between said members is reduced.

5. An erosion prevention module according to claim 4, wherein said outer elongate members and said central elongate member are overlapped and the overlapped region chamfered to space said outer elongate members from said central elongate member, whereby greater structural stability within an array of said structures is achieved.

6. An erosion prevention module according to claim 4, wherein each of said elongate members are equal in length.

7. An erosion prevention module according to claim 6, wherein each of said elongate members are formed of concrete.

8. An erosion prevention module according to claim 1, wherein each of said elongate members contain internal reinforcements.

9. An erosion prevention module according to claim 8, wherein said reinforcements comprise metal rods.

* * * * *